United States Patent [19]
Teramoto et al.

[11] Patent Number: 6,042,773
[45] Date of Patent: Mar. 28, 2000

[54] PROCESS FOR PRODUCING AROMATIC POLYESTER

[75] Inventors: Mitsuru Teramoto; Masahiko Kosuge, both of Matsuyama, Japan

[73] Assignee: Teijin Limited, Osaka, Japan

[21] Appl. No.: 09/066,594

[22] Filed: Apr. 27, 1998

[30] Foreign Application Priority Data

Apr. 25, 1997 [JP] Japan ................................. 9-108865

[51] Int. Cl.$^7$ ........................... B29C 41/26; C08G 63/16
[52] U.S. Cl. ........................ 264/484; 264/211; 264/216; 528/275; 528/286
[58] Field of Search ........................ 264/484, 211, 264/216; 528/275, 276, 286, 287, 293, 295, 308

[56] References Cited

U.S. PATENT DOCUMENTS 5,188,774  2/1993  Nitta et al. .

FOREIGN PATENT DOCUMENTS

| 0 159 817 A2 | 10/1985 | European Pat. Off. . |
| 2 0 280 026 | 8/1988 | European Pat. Off. . |
| 1 0 403 644 | 12/1990 | European Pat. Off. . |
| 1 0 578 464 | 1/1994 | European Pat. Off. . |
| 25 03 847 | 8/1976 | Germany . |

*Primary Examiner*—Mathieu D. Vargot
*Attorney, Agent, or Firm*—Sughure, Mion, Zinn, Macpeak & Seas, PLLC

[57] ABSTRACT

A process for producing an aromatic polyester by esterifying a dicarboxylic acid mainly composed of an aromatic dicarboxylic acid and a glycol mainly composed of ethylene glycol in the presence of 1 to 30 mmol %, based on the dicarboxylic acid, of a quaternary phosphonium sulfonate having ester-forming functional group(s), and then polycondensing the resulting product.

28 Claims, No Drawings

PROCESS FOR PRODUCING AROMATIC POLYESTER

DETAILED DESCRIPTION OF THE INVENTION

The present invention relates to a process for producing an aromatic polyester and to a process for producing a film from the polyester. More specifically, it relates to a process for producing an aromatic polyester which has excellent close-contact with a cooling drum, rarely contaminates an electrostatic wire and can achieve high film productivity when an aromatic polyester film is produced by an electrostatic casting method and to a process for producing a film from the aromatic polyester.

An aromatic polyester film typified by a polyethylene terephthalate film is used for various applications such as magnetic tapes, electrical insulations, capacitors, photographs and packages due to its excellent physical and chemical properties.

A polyester film is generally produced by quenching a film-shaped molten polyester melt-extruded from an extrusion die, on the surface of a rotating cooling drum and stretching it in both longitudinal and transverse directions. In this case, to eliminate film surface defects and improve uniformity in the thickness of the film, close-contact between the melt-extruded film-shaped polyester and the surface of the rotating cooling drum must be enhanced. For this purpose, there is known a method (to be referred to as "electrostatic casting method" hereinafter) in which a wire metal electrode (to be referred to as "electrostatic wire" hereinafter) is provided between the extrusion die and the surface of the rotating cooling drum to deposit static electric charge on the surface of the film-shaped molten product.

A reduction in production costs by enhancing the productivity of films is an important theme together with improvement in film quality. Increasing film formation speed by accelerating the peripheral speed of the above rotating cooling drum is the most effective method to attain the above theme. Meanwhile, as the peripheral speed of the rotating cooling drum is increased in the above electrostatic casting method, the amount of static charge per unit area on the surface of the film-shaped product decreases, whereby the close-contact of the film with the rotating cooling drum lowers, surface defects are produced on the film, or the thickness of the film becomes non-uniform. Although a measure for increasing the amount of static charge to be deposited on the molten polyester by increasing voltage to be applied to the electrode in order to improve the close-contact can be taken, an arc discharge is produced between the electrode and the rotating cooling drum when the application voltage is increased excessively, with the result that the film-shaped product on the surface of the cooling drum may be broken, or the surface of the cooling drum may be damaged. Therefore, it is virtually impossible to increase voltage to be applied to the electrode to a level higher than a certain level.

As a process for producing a polyester film efficiently by improving the film formation speed, which overcomes the limit of such electrostatic casting method, there is proposed a process in which the specific resistance of a molten polyester is reduced.

That is, U.S. Pat. No. 5,188,774 proposes the use of an aromatic polyester which contains 0.1 to 45 mmol %, based on a dysfunctional dicarboxylic acid component, of a quaternary phosphonium sulfonate having an ester-forming functional group in the polymer chain and has a AC volume resistivity of a molten film of $6.5 \times 10^8$ Ωcm or less. However, it has been revealed that this proposal involves the following problem. Since a sublimate which is considered to have generated from a film-shaped molten polyester extruded from an extrusion die is adhered to the electrostatic wire as a fouling when the above film formation method is carried out, the close-contact of the polyester with the cooling drum is lowered by a reduction in electric current and the generation of a discharge spark, with the consequence that the electrostatic wire must be exchanged in a short period of time and rather, the productivity lowers. This publication also discloses the use of an aromatic polyester containing 0.1 to 45 mmol %, based on a dysfunctional carboxylic acid component, of a quaternary phosphonium sulfonate having an ester-forming functional group in the polymer chain and further 0.1 to 20 mmol %, based on a dysfunctional carboxylic acid component, of an alkali metal or an alkaline earth metal compound in order to improve the melt stability of the polyester. However, this publication also teaches that there is no specific weight ratio between the amount of the quaternary phosphonium sulfonate copolymerized and the amount of the alkali metal or alkaline earth metal compound added, for achieving a greater effect. Further, nothing is mentioned about the relationship between the addition of the alkali metal or the alkaline earth metal compound and the contamination of the electrostatic wire.

It is an object of the present invention to provide a process for producing an aromatic polyester which has excellent close-contact with a rotating cooling drum, rarely contaminates an electrostatic wire and can achieve high productivity when an aromatic polyester film is produced by an electrostatic casting method.

It is another object of the present invention to provide a process for producing an aromatic polyester film from the above aromatic polyester at a high productivity in accordance with an electrostatic casting method, wherein the aromatic polyester film is brought into close contact with a rotating cooling drum and the contamination of the electrostatic wire is suppressed.

Other objects and advantages of the present invention will become apparent from the following description.

According to the present invention, firstly, the above objects and advantages of the present invention can be attained by a process for producing an aromatic polyester by esterifying a dicarboxylic acid mainly composed of an aromatic dicarboxylic acid and a glycol mainly composed of ethylene glycol and then polycondensing the resulting product, wherein the process comprises carrying out the esterification in the presence of 1 to 30 mmol %, based on the dicarboxylic acid, of a quaternary phosphonium sulfonate having an ester-forming functional group, adding at least one metal compound selected from the group consisting of a lithium compound, calcium compound, magnesium compound, cerium compound and cobalt compound or a combination of the metal compound and a phosphorus compound to a reaction system in such an amount that satisfies the following expressions (1) to (3):

$$1 \leq M \leq 100 \tag{1}$$

$$0 \leq P \leq 20 \tag{2}$$

$$1.0 \leq M/(S+P) \leq 5.0 \tag{3}$$

wherein M, P and S are mmol %, based on the dicarboxylic acid, of the metal compound, phosphorus compound and quaternary phosphonium sulfonate having an ester-forming functional group, respectively, after the esterification substantially terminates, and then, carrying out the polycondensation in the presence of a polycondensation catalyst.

The process of the present invention is a process for producing an aromatic polyester comprising esterifying a dicarboxylic acid mainly composed of an aromatic dicarboxylic acid and a glycol mainly composed of ethylene glycol and then polycondensing the resulting product.

The dicarboxylic acid mainly composed of an aromatic dicarboxylic acid preferably contains an aromatic dicarboxylic acid in an amount of at least 70 mol %, more preferably 80 molt, particularly preferably 85 mol %. Therefore, a dicarboxylic acid other than the aromatic dicarboxylic acid is preferably contained in an amount of 30 mol % or less, more preferably 20 mol % or less, particularly preferably 15 mol % or less.

Illustrative examples of the aromatic dicarboxylic acid include terephthalic acid, naphthalenedicarboxylic acid, isophthalic acid, diphenyldicarboxylic acid and the like. These aromatic dicarboxylic acids may be used alone or in combination of two or more.

Illustrative examples of the dicarboxylic acid other than the above aromatic dicarboxylic acid include aliphatic dicarboxylic acids such as adipic acid and sebacic acid; and alicyclic dicarboxylic acids such as cyclohexane-1,4-dicarboxylic acid.

The glycol mainly composed of ethylene glycol preferably contains ethylene glycol in an amount of at least 80 mol %, more preferably at least 90 mol %, particularly preferably at least 95 mol %. Therefore, a glycol other than ethylene glycol is preferably contained in an amount of 20 mol % or less, more preferably 10 mol % or less, particularly preferably 5 mol % or less.

Illustrative examples of the glycol other than ethylene glycol include polymethylene glycols having 3 to 10 carbon atoms such as trimethylene glycol, tetramethylene glycol and hexamethylene glycol; alicyclic glycols such as cyclohexane dimethanol; and aromatic glycols such as hydroquinone, resorcin and 2,2-bis(4-hydroxyphenyl) propane.

As can be understood from the above, the aromatic polyester in the present invention is a polyester which comprises an aromatic dicarboxylic acid as a main acid component and ethylene glycol as a main glycol component, and such polyester is substantially linear and has film forming properties, particularly film forming properties by melt-extrusion.

The particularly preferred aromatic polyester is polyethylene terephthalate, polyethylene-2,6-naphthalate or a copolymer containing terephthalic acid or 2,6-naphthalenedicarboxylic acid in an amount of 80 mol % or more of the total of all dicarboxylic acid components and ethylene glycol in an amount of 80 mol % or more of the total of all glycol components.

A component derived from an oxycarboxylic acid such as an aromatic oxyacid, e.g. hydroxybenzoic acid, or an aliphatic oxyacid, e.g. ω-hydroxycaproic acid, may be copolymerized with or bonded to the above aromatic polyester in an amount of 10 mol % or less based on the total amount of dicarboxylic acid and oxycarboxylic acid components as long as it does not impair the effect of the present invention.

A polycarboxylic acid or polyhydroxy compound having at least 3 functional groups such as trimellitic acid or pentaerythritol may further be copolymerized with the polyester in such an amount that the polyester is virtually linear and the effect of the present invention is not impaired, for example, in an amount of 2 mol % or less based on the total of all acid components.

In the process of the present invention, the above esterification reaction is carried out in the co-presence of 1 to 30 mmol %, based on the dicarboxylic acid, of a quaternary phosphonium sulfonate having an ester-forming functional group. The esterification reaction can be carried out in the presence of a known esterification catalyst per se or in the substantial absence of the esterification catalyst because it proceeds even in the absence of the esterification catalyst. The esterification can be started in the co-presence of a glycol ester of an aromatic dicarboxylic acid or an oligomer thereof.

The above quaternary phosphonium sulfonate having an ester-forming functional group is preferably a compound represented by the following formula:

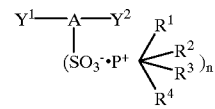

wherein A is an aromatic group having 6 to 18 carbon atoms which may be substituted with an alkyl group having 1 to 12 carbon atoms, $Y^1$ and $Y^2$ are the same or different and each a hydrogen atom or ester-forming-functional group, $R^1$, $R^2$, $R^3$ and $R^4$ are the same or different and each an alkyl group having 1 to 18 carbon atoms, a benzyl group or an aryl group having 6 to 12 carbon atoms, and n is 1 or 2, provided that $Y^1$ and $Y^2$ cannot be a hydrogen atom at the same time.

In the above formula, the aromatic ring having 6 to 18 carbon atoms and represented by A is preferably a benzene ring, naphthalene ring or biphenyl ring. The aromatic ring may be substituted by an alkyl group having 1 to 12 carbon atoms. The alkyl group having 1 to 12 carbon atoms may be either straight-chain or branched-chain, as exemplified by methyl, ethyl, n-propyl, iso-propyl, n-butyl, sec-butyl, iso-butyl, tert-butyl, n-pentyl, n-hexyl, n-octyl, n-nonyl, n-decyl, n-undecyl and n-dodecyl.

$Y^1$ and $Y^2$ are the same or different and each a hydrogen atom or an ester-forming functional group, provided that $Y^1$ and $Y^2$ cannot be a hydrogen atom at the same time and that at least one of them is an ester-forming functional group.

Illustrative examples of the ester-forming functional group include —COOH, —COOR', —OCOR', —(CH$_2$)$_m$OH, —(OCH$_2$)$_m$OH and the like. In these groups, R' is a lower alkyl group having 1 to 4 carbon atoms or a phenyl group, and m is an integer of 1 to 10. R' is preferably methyl, ethyl, n-propyl, isopropyl, n-butyl or the like. $R^1$, $R^2$, $R^3$ and $R^4$ constituting a quaternary phosphonium sulfonate group are the same or different and each an alkyl group having 1 to 18 carbon atoms, a benzyl group or an aryl group having 6 to 12 carbon atoms. Illustrative examples of the alkyl group having 1 to 18 carbon atoms include those listed for the above alkyl group having 1 to 12 carbon atoms, stearyl group and the like.

Illustrative examples of the aryl group having 6 to 12 carbon atoms include phenyl, naphthyl, biphenyl and the like.

Preferred examples of the quaternary phosphonium sulfonate include tetrabutylphosphonium 3,5-dicarboxybenzenesulfonate, ethyltributylphosphonium 3,5-dicarboxybenzenesulfonate, benzyltributylphosphonium 3,5-dicarboxybenzenesulfonate, phenyltributylphosphonium 3,5-dicarboxybenzenesulfonate, tetraphenylphosphonium 3,5-dicarboxybenzenesulfonate, butyltriphenylphosphonium 3,5-dicarboxybenzenesulfonate, tetrabutylphosphonium 3,5-dicarbomethoxybenzenesulfonate, ethyltributylphosphonium 3,5-dicarbomethoxybenzenesulfonate, benzyltributylphosphonium 3,5-dicarbomethoxybenzenesulfonate, phenyltributylphosphonium 3,5-dicarbomethoxybenzenesulfonate, tetrabutylphosphonium 3, 5-di(β-hydroxyethoxycarbonyl)benzenesulfonate, tetraphenylphosphonium 3,5-di(β-hydroxyethoxycarbonyl)benzenesulfonate, tetrabutylphosphonium 3-dicarboxybenzenesulfonate, tetraphenylphosphonium 3-dicarboxybenzenesulfonate, tetrabutylphosphonium 3-di(β-hydroxyethoxycarbonyl)benzenesulfonate, tetraphenylphosphonium 3-di(β-hydroxyethoxycarbonyl)benzenesulfonate, tetrabutylphosphonium 4-di(β-hydroxyethoxycarbonyl)benzenesulfonate, bisphenol A-3,3-di(tetrabutyl phosphonium sulfonic acid salt), 2,6-dicarboxynaphthalene-4-sulfonic acid tetrabutyl phosphonium salt and the like. The above quaternary phosphonium sulfonates may be used alone or in combination of two or more.

The process of the present invention comprises adding at least one metal compound selected from the group consisting of a lithium compound, calcium compound, magnesium compound, cerium compound and cobalt compound, or a combination of the metal compound and a phosphorus compound to a reaction system after an esterification reaction in the co-presence of the above quaternary phosphonium sulfonate substantially ends, preferably at least 90%, more preferably at least 95% of the esterification reaction ends.

The amount of the above addition must satisfy the following expressions (1) to (3):

$$1 \leq M \leq 100 \tag{1}$$

$$0 \leq P \leq 20 \tag{2}$$

$$1.0 \leq M/(S+P) \leq 5.0 \tag{3}$$

wherein M, P and S are mmol % based on the dicarboxylic acid of the metal compound, phosphorus compound and quaternary phosphonium sulfonate having an ester-forming functional group, respectively.

It is considered that the metal compound functions to reduce adhesion of contamination to the electrostatic wire, which is one of the objects of the present invention. That is, contamination on the electrostatic wire are the decomposed product of the quaternary phosphonium sulfonate produced from a molten aromatic polyester. It is assumed that the presence of the metal compound contained in the polyester suppresses the decomposition of the quaternary phosphonium sulfonate or that the decomposed product is captured in the polyester.

As for the above expression (1), when the amount of the metal compound is more than 10 mmol %, the heat stability of the polyester lowers, whereby the resulting film is colored or surface defects are produced in the film. On the other hand, when the amount is less than 1 mmol %, adhesion of contamination to the electrostatic wire cannot be reduced disadvantageously.

As for the above expression (2), when the amount of the phosphorus compound is more than 20 mmol %, the effect of improving the heat stability of the polyester is saturated and further the phosphorus compound is also liable to become one of the causes of contamination on the electrostatic wire.

As for the above expression (3), when the value of M/(S+P) is smaller than 1.0, the effect of suppressing adhesion of contamination to the electrostatic wire cannot be virtually obtained, while when it is larger than 5.0, the effect is saturated.

When the metal compound is added too early, the amount of by-produced diethylene glycol is large, whereby the melting point of the polyester lowers, with the result that the film is easily adhered to the rotating cooling drum, or that the film is easily ruptured at the time of stretching.

The above expression (1) is preferably the following expression (1)-1.

$$10 \leq M \leq 90 \tag{1-1}$$

wherein M is the same as defined in the above expression.

The above expression (2) is preferably the following expression (2)-1.

$$1 \leq P \leq 20 \tag{2-1}$$

wherein P is the same as defined in the above expression.

The above expression (3) is preferably the following expression (3)-1.

$$1.3 \leq M/(S+P) \leq 4.0 \tag{3-1}$$

In the above expression (2)-1, when the amount of the phosphorus compound is more than 1 mmol %, the heat stability of the obtained aromatic polyester becomes sufficient and the electrostatic wire is hardly contaminated, which is advantageous.

The lithium compound is preferably lithium acetate, lithium chloride or lithium hydroxide.

The calcium compound is preferably calcium acetate, calcium oxide or calcium chloride.

The magnesium compound is preferably magnesium oxide, magnesium chloride, magnesium hydride, magnesium hydroxide, magnesium sulfate, magnesium phosphate, magnesium acetate, magnesium benzoate or magnesium phthalate.

The cerium compound is preferably cerium acetate, cerium chloride or cerium oxide.

The cobalt compound is preferably cobalt acetate or cobalt chloride.

The above metal compounds may be used alone or in combination of two or more.

Of the above metal compounds, a magnesium compound is particularly preferred.

Illustrative examples of the phosphorus compound include trimethyl phosphate, triethyl phosphate, tri-n-butyl phosphate, phosphoric acid and the like. Of these, trimethyl phosphate is preferred. The use of a phosphorus compound is preferred because it improves the heat stability of the aromatic polyester.

In the process of the present invention, polycondensation is then carried out in the presence of a polycondensation catalyst. The polycondensation is carried out at a reduced pressure. The polycondensation catalyst can be added to the reaction system before, after or simultaneously with the addition of the metal compound.

The polycondensation catalyst is selected from, for example, a titanium compound, zinc compound, manganese compound, germanium compound and antimony compound.

Illustrative examples of the titanium compound include titanium tetrabutoxide, titanium tetra-iso-propoxide and titanium trimellitate.

Illustrative examples of the zinc compound include zinc acetate, zinc benzoate and zinc hydroxide.

Illustrative examples of the manganese compound include manganese acetate, manganese benzoate and manganese chloride.

Illustrative examples of the germanium compound include germanium oxide and germanium chloride.

Illustrative examples of the antimony compound include antimony trioxide and antimony acetate.

These polycondensation catalysts may be used alone or in combination of two or more.

According to the present invention, an aromatic polyester having an intrinsic viscosity of preferably 0.45 to 0.75 is obtained.

The aromatic polyester obtained by the process of the present invention preferably has an AC volume resistivity of $2.0 \times 10^8$ Ωcm or less, more preferably $1.0 \times 10^8$ to $6.0 \times 10^6$ Ωcm when it is molten.

An aromatic polyester having an AC volume resistivity of $2.0 \times 10^8$ Ωcm or less when it is molten can have a sufficient amount of electric charge which allows it to make close-contact even with a relatively fast rotating cooling drum and film formation speed can be thereby improved, which is one of the objects of the present invention.

Further, the aromatic polyester in the present invention can contain such additives as a pigment, dye, antioxidant, photostabilizer and light screening agent (such as carbon black, titanium oxide or the like) as required as long as they do not impair surface flatness and resistance to dry heat deterioration properties.

As for other conditions of the esterification reaction and polycondensation reaction in the present invention, conventionally known conditions can be employed.

According to studies conducted by the present inventors, it has been revealed that the above objects and effects of the present invention can also be attained by the following process of the present invention.

That is, according to the present invention, secondly, there is provided a process (to be referred to as "second process of the present invention" hereinafter) for producing an aromatic polyester by esterifying a dicarboxylic acid mainly composed of an aromatic dicarboxylic acid and a glycol mainly composed of ethylene glycol and then polycondensing the resulting product, wherein the process comprises carrying out the esterification in the presence of 1 to 30 mmol %, based on the dicarboxylic acid, of a quaternary phosphonium sulfonate having an ester-forming functional group(s), adding at least one metal compound selected from the group consisting of a zinc compound, titanium compound, manganese compound and germanium compound, or a combination of at least one of the metal compounds and a phosphorus compound to a reaction system in such an amount that satisfies the following expressions (1) to (3):

$$1 \leq M \leq 100 \quad (1)$$
$$0 \leq P \leq 20 \quad (2)$$
$$1.0 \leq M/(S+P) \leq 5.0 \quad (3)$$

wherein M, P and S are mmol %, based on the dicarboxylic acid, of the metal compound, phosphorus compound and quaternary phosphonium sulfonate having an ester-forming functional group, respectively, then, mixing it at normal pressure after the esterification substantially terminates, and thereafter carrying out the polycondensation.

The second process of the present invention differs from the above-described process of the present invention (may be referred to as "first process of the present invention" hereinafter) in the following points when compared with the first process of the present invention.

(i) The metal compound is a zinc compound, titanium compound, manganese compound or germanium compound; and (ii) the metal compound is added to the reaction system and then mixed at normal pressure before polycondensation.

The zinc compound, titanium compound, manganese compound or germanium compound as the metal compound is used as a polycondensation catalyst in the first process of the present invention. That is, in the second process of the present invention, the metal compound is added to the reaction system before polycondensation. Therefore, a polycondensation catalyst does not always need to be added when polycondensation is carried out.

In the second process of the present invention, after the metal compound has been added to the reaction system, it is preferably mixed for about 5 to about 30 minutes at normal pressure before polycondensation is carried out.

It should be understood that others concerning the second process of the present invention and not described herein are the same as those of the first process of the present invention.

The aromatic polyester obtained by the processes (including both first and second processes) of the present invention can be given a sufficient amount of charge to allow it to make a close-contact with the rotating cooling drum as described above.

Therefore, according to the present invention, there is further provided a process for producing an aromatic polyester film by forming the aromatic polyester obtained by the process of the present invention into a film in accordance with an electrostatic casting method.

According to the present invention, the above aromatic polyester is extruded from a slit onto a rotating cooling drum at a temperature of its melting point (Tm; °C.) to (Tm+70) °C. and quenched to produce a 10 to 5,000 μm thick unoriented film, for example. The unoriented film is stretched to 2.5 to 5.0 times in a uniaxial direction (longitudinal or transverse direction) at a temperature of (Tg −10) to (Tg+70)°C. (Tg: glass transition temperature of the polyester) and then to 2.5 to 5.0 times in a direction perpendicular to the above direction (transverse direction when first stretched in a longitudinal direction) at a temperature of Tg to (Tg+70)°C. to produce a biaxially oriented film. In this case, the area stretch ratio is preferably 9 to 22 times, more preferably 12 to 22 times. The stretching means is either simultaneous biaxial stretching or sequential biaxial stretching. The obtained film can be further heat set at a temperature of (Tg+70) to Tm°C. For example, a polyester terephthalate film is preferably heat set at 200 to 240° C. The heat setting time is 1 to 60 sec, for example.

In this process, the molten film extruded onto the rotating cooling drum is forcedly given electric charge from an electrode (metal wire; electrostatic wire) which is installed without contact, for example, 3 to 10 mm away from the film surface near a position where (right before) it reaches the drum. Since the aromatic polyester contains 1 to 30 mmol % of a quaternary phosphonium sulfonate as described above and preferably shows an AC volume resistivity of $2.0 \times 10^8$ Ωcm or less in a molten state, it is given electric charge so that it can make an uniform and close-contact even with the relatively fast rotating cooling drum.

As described above, as the aromatic polyester contains a specific amount of a metal compound such as a magnesium compound, it rarely contaminates the electrostatic wire and, advantageously, reduces the frequency of exchanging the electrostatic wire.

As described above, in the film formation process based on the electrostatic casting method, the aromatic polyester of the present invention can increase the rotating spherical speed of the rotating cooling drum and improve the film production efficiency.

A film of the aromatic polyester produced by the present invention is advantageously used in the field of films used for various applications such as magnetic tapes, electric insulation, capacitors, photographs and packages.

EXAMPLES

The following examples are given to further illustrate the present invention. "Parts" in the following examples means "parts by weight". The value of each property of the following examples was measured in accordance with the following method.

(1) Intrinsic Viscosity

Measured in o-chlorophenol as a solvent at 35° C.

(2) Electrostatic Casting Properties

When a polymer is extruded into a film from a die and cast on a cooling drum, a voltage of 7,000 V is applied between the polymer and the cooling drum by an electrode installed above the extruded film near the die. At this point, the maximum speed of the cooling drum at which a film can be formed stably without producing film surface defects and deteriorating the uniformity in thickness is obtained. The electrostatic casting properties can be ranked as follows according to the maximum speed of the cooling drum.

rank A: A film can be formed stably at a cooling drum speed of 70 m/min or more.

rank B: A film can be formed stably at a cooling drum speed of 60 m/min or more and less than 70 m/min.

rank C: A film can be formed stably at a cooling drum speed of 55 m/min or more and less than 60 m/min.

rank D: A film can be formed stably only at a cooling drum speed of less than 55 m/min.

(3) Contamination of Electrostatic Wire

The rate of reduction in the current value of the electrostatic wire due to the contamination of the electrostatic wire is checked in the above electrostatic casting property test (2) and by extending the test time. A current value at the start of the test and a current value at the end of the test are read and a difference between them is divided by the test time to obtain a current reduction rate per unit time. The contamination of the electrostatic wire can be ranked based on the value.

rank A: current reduction rate of less than 1%/hr rank B: current reduction rate of 1%/hr or more and less than 5%/hr rank C: current reduction rate of 5%/hr or more and less than 10%/hr rank D: current reduction rate of 10%/hr or more When the contamination of the electrostatic wire is ranked A, the electrostatic wire has no practical problem. When the contamination of the electrostatic wire is ranked B or C, the electrostatic wire must be exchanged frequently and is not advantageous in view of production efficiency. When the contamination of the electrostatic wire is ranked D, the electrostatic wire cannot be put to practical use.

(4) AC Volume Resistivity of Molten Polymer

A container which contains a polymer to be measured and has a pair of electrodes inserted into the polymer is immersed in a heating medium, and the polymer is molten by heating to 285° C. and maintained at this temperature. A voltage of 100V–50 Hz is applied to the electrodes inserted into the polymer from an externally connected AC power source. The AC voltage resistivity of the polymer is determined from values indicated by an ammeter and a voltmeter, the total area of the electrodes and the distance between the electrodes.

(5) Film Surface Defects

Particulate foreign matters by-produced in the step of the polymerization of a thermoplastic polyester or the step of extrusion thereof are evaluated. A virtually amorphous film is obtained by extruding a molten polymer at 285° C. and bringing it into close contact with the rotating cooling drum to be cooled. Thereafter, this is stretched to 3.6 times in a longitudinal direction and to 3.9 times in a transverse direction to produce a 15 μm-thick film. This film is observed through a phase difference microscope to count the number of particles having a maximum length of 10 μm or more within the image of the microscope with the Luzex 500 image analyzer (a product of Nippon Regulator Co., Ltd). A film having particles at a density of $10/cm^2$ or less can be put to practical use.

Example 1

A mixture of 30 parts of ethylene glycol and 0.04 part of tetrabutylphosphonium 3,5-dicarboxybenzenesulfonate was added to 100 parts of a bis-β-hydroxyethyl ester of terephthalic acid and 65 parts of terephthalic acid to carry out an esterification reaction at a temperature of 210 to 230° C. The reaction was terminated when the amount of water produced by the reaction became 13 parts, 0.034 part of a magnesium acetate tetrahydrate and 0.006 part of trimethyl phosphate were added and stirred for 10 minutes, and an ethylene glycol slurry containing 0.075 part of spherical silica particles (having an average particle diameter of 0.5 μm) and 0.046 part of antimony trioxide were added. Thereafter, the reaction product was transferred to a polymerization reactor and heated to 290° C. to carry out a polycondensation reaction at a high vacuum degree of 0.2 mmHg or less, whereby a polyester having an intrinsic viscosity of 0.62 was obtained. This polyester had an AC volume resistivity of $5.8 \times 10^7$ Ωcm at 285° C.

Pellets of this polyester were dried at 170° C. for 3 hours, supplied to the hopper of an extruder and melt-extruded to a thickness of 200 μm through a 1 mm slit die at a melting temperature of 290° C. The extrudate was then brought into close-contact with a rotating cooling drum having a surface finish of about 0.3 s and a surface temperature of 20° C., using a linear electrode, to be solidified. At this point, the speed of the cooling drum was increased gradually and the maximum casting speed at which a cooled film could be formed stably without producing film surface defects caused by a contact failure was 100 m/min. Thereafter, this unoriented film was preheated at 75° C., stretched to 3.6 times by heating with a single IR heater having a surface temperature of 900° C. from 15 mm above the film between a low-speed roll and a high-speed roll, and supplied to a stenter to be stretched to 3.9 times in a transverse direction at 105° C. The obtained biaxially oriented film was heat set at 230° C. for 5 seconds to obtain a 14 μm-thick heat-set biaxially oriented film.

The properties of this film are shown in Table 1.

Examples 2 to 4

Aromatic polyesters and polyester films were obtained in the same manner as in Example 1 except that the amounts of tetrabutylphosphonium 3,5-dicarboxybenzenesulfonate, magnesium acetate and trimethyl phosphate were respectively changed as shown in Table 1. The properties of the films are shown in Table 1.

Example 5

A mixture of 30 parts of ethylene glycol and 0.04 part of tetrabutylphosphonium 3,5-dicarboxybenzenesulfonate was added to 120 parts of a bis-β-hydroxyethyl ester of 2,6-naphthalenedicarboxylic acid and 85 parts of 2,6-naphthalenedicarboxylic acid to carry out an esterification reaction at 210 to 230° C. The reaction was terminated when the amount of water produced by the reaction became 13 parts, 0.076 parts of a magnesium acetate tetrahydrate and 0.006 part of trimethyl phosphate were added and stirred for 10 minutes, and an ethylene glycol slurry containing 0.075 part of spherical silica particles (having an average particle diameter of 0.5 μm) and 0.046 part of antimony trioxide were added. Thereafter, the reaction product was transferred to a polymerization reactor and heated to 295° C. to carry out a polycondensation reaction at a high vacuum degree of 0.2 mmHg or less, whereby a polyester having a viscosity of 0.61 was obtained.

A polyester film was obtained using this polyester in the same manner as in Example 1 except that the melting temperature was changed to 300° C. The properties of this film are shown in Table 1.

Example 6

An aromatic polyester and a biaxially oriented film were obtained in the same manner as in Example 1 except that 0.05 part of tetraphenylphosphonium 3,5-dicarboxybenzenesulfonate was used in place of 0.04 part of tetrabutylphosphonium 3,5-dicarboxybenzenesulfonate and the amount of magnesium acetate was changed as shown in Table 1. The properties of this film are shown in Table 1.

Example 7

An aromatic polyester and a biaxially oriented film were obtained in the same manner as in Example 1 except that 0.054 part of magnesium oxide was used in place of 0.034 part of magnesium acetate. The properties of this film are shown in Table 1.

Comparative Examples 1 to 3

Aromatic polyesters and polyester films were obtained in the same manner as in Example 1 except that the amounts of tetrabutylphosphonium 3,5-dicarboxybenzenesulfonate, magnesium acetate and trimethyl phosphate were changed as shown in Table 1. The properties of these films are shown in Table 1. In all of these comparative examples, the electrostatic wire was contaminated much. Thus, unsatisfactory results were obtained.

Comparative Example 4

An aromatic polyester and a polyester film were obtained in the same manner as in Example 1 except that sodium acetate whose amount was shown in Table 1 was used in place of magnesium acetate. The properties of this film are shown in Table 1. The electrostatic wire was contaminated much. Thus, unsatisfactory results were obtained.

Comparative Examples 5 and 6

Aromatic polyesters and polyester films were obtained in the same manner as in Example 1 except that the amounts of tetrabutylphosphonium 3,5-dicarboxybenzenesulfonate, magnesium acetate and trimethyl phosphate were changed as shown in Table 1. The properties of these films are shown in Table 1. In all of these comparative examples, the obtained films had many surface defects. Thus, unsatisfactory results were obtained.

Comparative Examples 7 and 8

Aromatic polyesters and polyester films were obtained in the same manner as in Example 1 except that the amount of tetrabutylphosphonium 3,5-dicarboxybenzenesulfonate was changed as shown in Table 1. The properties of these films are shown in Table 1. Since the content of the quaternary phosphonium sulfonate was small in all of these comparative examples, sufficient electrostatic contact could not be obtained. Thus, unsatisfactory results were obtained.

Comparative Examples 9 to 11

Aromatic polyesters and polyester films were obtained in the same manner as in Example 1 except that tetrabutylphosphonium 3,5-dicarboxybenzenesulfonate and magnesium acetate were changed as shown in Table 1. The properties of these films are shown in Table 1. Sufficient electrostatic contact was not obtained in all of these comparative examples. Thus, unsatisfactory results were obtained.

TABLE 1

| | quaternary phosphonium sulfonate | | magnesium compound | | trimethyl | | AC volume resistivity of | electro-static | contamination of | film surface |
|---|---|---|---|---|---|---|---|---|---|---|
| | kind | amount S (mmol %) | kind | amount M (mmol %) | phosphate amount P (mmol %) | M/(S + P) | molten polymer (Ωcm) | casting properties | electrostatic wire | defects (number/ 100 cm²) |
| Ex. 1 | tetrabutyl-phosphonium 3,5-dicarboxybenzene-sulfonate | 10 | magnesium acetate | 20 | 5 | 1.3 | $6.8 \times 10^7$ | A | B | 3 |
| Ex. 2 | same as above | 10 | same as above | 60 | 5 | 4.0 | $4.8 \times 10^7$ | A | A | 4 |
| Ex. 3 | same as above | 25 | same as above | 90 | 10 | 2.6 | $2.5 \times 10^7$ | A | A | 8 |
| Ex. 4 | same as above | 2 | same as above | 20 | 5 | 2.9 | $1.5 \times 10^8$ | B | A | 2 |
| Ex. 5 | same as above | 10 | same as above | 45 | 5 | 3.0 | $6.2 \times 10^7$ | A | A | 5 |
| Ex. 6 | tetraphenyl-phosphonium 3,5-dicarboxybenzene-sulfonate | 10 | same as above | 50 | 5 | 3.3 | $5.5 \times 10^7$ | A | A | 6 |
| Ex. 7 | tetrabutyl | 10 | magnesium | 40 | 5 | 2.7 | $6.0 \times 10^7$ | A | A | 9 |

TABLE 1-continued

| | quaternary phosphonium sulfonate | | magnesium compound | | trimethyl | | AC volume resistivity of | electro-static | contamin-ation of | film surface |
|---|---|---|---|---|---|---|---|---|---|---|
| | kind | amount S (mmol %) | kind | amount M (mmol %) | phosphate amount P (mmol %) | M/(S + P) | molten polymer (Ωcm) | casting propert-ies | electros-tatic wire | defects (number/ 100 cm$^2$) |
| | phosphonium 3,5-dicarboxybenzene-sulfonate | | oxide | | | | | | | |
| C. Ex. 1 | tetrabutyl phosphonium 3,5-dicarboxybenzene-sulfonate | 10 | none | 0 | 5 | 0 | 6.8 × 10$^7$ | A | D | 2 |
| C. Ex. 2 | same as above | 15 | magnesium acetate | 15 | 5 | 0.75 | 4.3 × 10$^7$ | A | C | 3 |
| C. Ex. 3 | same as above | 10 | same as above | 50 | 30 | 1.25 | 5.2 × 10$^7$ | A | C | 8 |
| C. Ex. 4 | same as above | 10 | sodium acetate | 50 | 5 | 3.3 | 5.5 × 10$^7$ | A | D | 4 |
| C. Ex. 5 | same as above | 10 | magnesium acetate | 110 | 10 | 5.5 | 3.2 × 10$^7$ | A | B | 25 |
| C. Ex. 6 | same as above | 35 | same as above | 75 | 5 | 1.9 | 1.3 × 10$^7$ | A | C | 18 |
| C. Ex. 7 | same as above | 0.5 | same as above | 10 | 5 | 1.8 | 2.5 × 10$^8$ | C | A | 12 |
| C. Ex. 8 | none | 0 | same as above | 20 | 5 | 4.0 | 5.5 × 10$^8$ | D | A | 2 |
| C. Ex. 9 | sodium 3,5-dicarboxybenzene-sulfonate | 15 | none | 0 | 5 | — | 2.9 × 10$^8$ | C | A | 5 |
| C. Ex. 10 | none | 0 | sodium acetate | 15 | 5 | — | 2.8 × 10$^8$ | C | A | 4 |
| C. Ex. 11 | none | 0 | potassium acetate | 15 | 5 | — | 2.3 × 10$^8$ | C | A | 5 |

Ex.: Example
C. Ex.: Comparative Example

Examples 7 to 14

Aromatic polyesters and polyester films were obtained in the same manner as in Example 1 except that the amount of tetrabutylphosphonium 3,5-dicarboxybenzenesulfonate was changed to 15 mmol % and the magnesium compound and trimethyl phosphate were changed as shown in Table 2. The results are shown in Table 1. In Examples 9, 11, 12 and 14, after addition of the metal compound, the ingredients were stirred for about 10 minutes at normal pressure without adding a Sb catalyst and polycondensation was started at a reduced pressure.

TABLE 2

| Ex. | metal compound | | trimethyl | | AC volume resistivity | electrostatic | contamination | film surface |
|---|---|---|---|---|---|---|---|---|
| | type | amount M (mmol %) | phosphate amount P (mmol %) | M/(S + P) | of molten polymer (Ωcm) | casting properties | of electrostatic wire | defects (number/ 100 cm$^2$) |
| 7 | lithium acetate | 50 | 10 | 2.0 | 5.3 × 10$^7$ | A | A | 5 |
| 8 | calcium acetate | 50 | 10 | 2.0 | 6.2 × 10$^7$ | A | A | 4 |
| 9 | zinc acetate | 50 | 10 | 2.0 | 4.8 × 10$^7$ | A | A | 7 |
| 10 | cerium acetate | 50 | 10 | 2.0 | 5.1 × 10$^7$ | A | A | 4 |
| 11 | titanium tetrabutoxide | 25 | 5 | 1.25 | 5.5 × 10$^7$ | A | A | 5 |
| 12 | manganese acetate | 50 | 10 | 2.0 | 4.5 × 10$^7$ | A | A | 6 |
| 13 | cobalt acetate | 50 | 10 | 2.0 | 5.3 × 10$^7$ | A | A | 3 |
| 14 | germanium oxide | 50 | 10 | 2.0 | 6.0 × 10$^7$ | A | A | 3 |

Ex.: Example

Since an aromatic polyester obtained by the production process of the present invention exhibits excellent close-contact with a rotating cooling drum and rarely contaminates an electrostatic wire when an aromatic polyester film is produced by an electrostatic casting method, high productivity can be obtained in a film formation step, and the resulting film has few surface defects and can be advantageously used for various applications such as magnetic tape, electric insulation, capacitors, photographs and packages.

What is claimed is:

1. A process for producing an aromatic polyester by esterifying a dicarboxylic acid mainly composed of an aromatic dicarboxylic acid and a glycol mainly composed of ethylene glycol and then polycondensing the resulting product, wherein the process comprises:

carrying out the esterification in the presence of 1 to 30 mmol %, based on the dicarboxylic acid, of a quaternary phosphonium sulfonate having ester-forming functional group(s);

adding at least one metal compound selected from the group consisting of a lithium compound, a calcium compound, a magnesium compound, a cerium compound and a cobalt compound, or a combination of at least one of said metal compounds and a phosphorus compound to a reaction system in such an amount that satisfies the following expressions (1) to (3):

$$1 \leq M \leq 100 \tag{1}$$

$$0 \leq P \leq 20 \tag{2}$$

$$1.0 \leq M/(S+P) \leq 5.0 \tag{3}$$

wherein M, P and S are mmol %, based on the dicarboxylic acid, of the metal compound, phosphorus compound and quaternary phosphonium sulfonate having ester-forming functional group(s), respectively, after the esterification substantially terminates, and then, carrying out the polycondensation in the presence of a polycondensation catalyst.

2. The process of claim 1, wherein the polycondensation catalyst is selected from the group consisting of a titanium compound, a zinc compound, a manganese compound, a germanium compound and a antimony compound.

3. The process of claim 1, wherein the polycondensation catalyst is added before, after or simultaneously with the addition of the metal compound.

4. The process of claim 1, wherein the metal compound is a magnesium compound.

5. The process of claim 1, wherein the quaternary phosphonium sulfonate having an ester-forming functional group(s) is represented by the following formula:

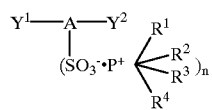

wherein A is an aromatic group having 6 to 18 carbon atoms which may be substituted by an alkyl group having 1 to 12 carbon atoms, $Y^1$ and $Y^2$ are the same or different and each is a hydrogen atom or an ester-forming functional group, $R^1$, $R^2$, $R^3$ and $R^4$ are the same or different and each is an alkyl group having 1 to 18 carbon atoms, a benzyl group or an aryl group having 6 to 12 carbon atoms, and n is 1 or 2, provided that $Y^1$ and $Y^2$ cannot be a hydrogen atom at the same time.

6. The process of claim 1, wherein the dicarboxylic acid mainly composed of an aromatic dicarboxylic acid contains an aromatic dicarboxylic acid in an amount of at least 70 mol %.

7. The process of claim 6, wherein the dicarboxylic acid other than the aromatic dicarboxylic acid is an aliphatic dicarboxylic acid or an alicyclic dicarboxylic acid.

8. The process of claim 1, wherein the glycol mainly composed of ethylene glycol contains ethylene glycol in an amount of at least 80 mol %.

9. The process of claim 8, wherein the glycol other than ethylene glycol is a polymethylene glycol having 3 to 10 carbon atoms, an alicyclic glycol or an aromatic glycol.

10. The process of claim 1, wherein the esterification is carried out in the substantial absence of an esterification catalyst.

11. The process of claim 1, wherein the esterification is started in the presence of a diglycol ester of an aromatic dicarboxylic acid or an oligomer thereof.

12. The process of claim 1, wherein the metal compound or a combination of the metal compound and a phosphorus compound is added in such an amount that satisfies the above expressions (1) and (2) and the following expression (3)-1:

$$1.3 \leq M/(S+P) \leq 4.0 \tag{3-1}$$

wherein M, S and P are the same as defined above.

13. The process of claim 12, wherein the following expression (1)-1 is satisfied in place of the above expression (1):

$$10 \leq M \leq 90 \tag{1-1}$$

wherein M is the same as defined above.

14. The process of claim 12 or 13, wherein the following expression (2)-1 is satisfied in place of the above expression (2):

$$1 \leq P \leq 20 \tag{2-1}$$

wherein P is the same as defined above.

15. A process for producing an aromatic polyester by esterifying a dicarboxylic acid mainly composed of an aromatic dicarboxylic acid and a glycol mainly composed of ethylene glycol and then polycondensing the resulting product, wherein the process comprises:

carrying out the esterification in the presence of 1 to 30 mmol %, based on the dicarboxylic acid, of a quaternary phosphonium sulfonate having an ester-forming functional group(s);

adding at least one metal compound selected from the group consisting of a zinc compound, a titanium compound, a manganese compound and a germanium compound, or a combination of at least one of said metal compounds and a phosphorus compound to a reaction system in such an amount that satisfies the following expressions (1) to (3):

$$1 \leq M \leq 100 \tag{1}$$

$$0 \leq P \leq 20 \tag{2}$$

$$1.0 \leq M/(S+P) \leq 5.0 \tag{3}$$

wherein M, P and S are mmol %, based on the dicarboxylic acid, of the metal compound, phosphorus compound and quaternary phosphonium sulfonate having an ester-forming functional group(s), respectively;

then, mixing it at normal pressure after the esterification substantially terminates; and thereafter, carrying out the polycondensation.

16. The process of claim 15, wherein the mixing at normal pressure is carried out for about 5 to about 30 minutes.

17. The process of claim 15, wherein the quaternary phosphonium sulfonate having an ester-forming functional group(s) is represented by the following formula:

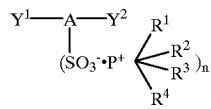

wherein A is an aromatic group having 6 to 18 carbon atoms which may be substituted by an alkyl group having 1 to 12 carbon atoms, $Y^1$ and $Y^2$ are the same or different and each is a hydrogen atom or an ester-forming functional group, $R^1$, $R^2$, $R^3$ and $R^4$ are the same or different and each is an alkyl group having 1 to 18 carbon atoms, a benzyl group or an aryl group having 6 to 12 carbon atoms, and n is 1 or 2, provided that $Y^1$ and $Y^2$ cannot be a hydrogen atom at the same time.

18. The process of claim 15, wherein the dicarboxylic acid mainly composed of an aromatic dicarboxylic acid contains an aromatic dicarboxylic acid in an amount of at least 70 mol %.

19. The process of claim 18, wherein the dicarboxylic acid other than the aromatic dicarboxylic acid is an aliphatic dicarboxylic acid or an alicyclic dicarboxylic acid.

20. The process of claim 15, wherein the glycol mainly composed of ethylene glycol contains ethylene glycol in an amount of at least 80 mol %.

21. The process of claim 20, wherein the glycol other than ethylene glycol is a polymethylene glycol having 3 to 10 carbon atoms, an alicyclic glycol or an aromatic glycol.

22. The process of claim 15, wherein the esterification is carried out in the substantial absence of an esterification catalyst.

23. The process of claim 15, wherein the esterification is started in the presence of a diglycol ester of an aromatic dicarboxylic acid or an oligomer thereof.

24. The process of claim 15, wherein the metal compound or a combination of the metal compound and a phosphorus compound is added in such an amount that satisfies the above expressions (1) and (2) and the following expression (3)-1:

$$1.3 \leq M/(S+P) \leq 4.0 \qquad (3)\text{-}1$$

wherein M, S and P are the same as defined above.

25. The process of claim 24, wherein the following expression (1)-1 is satisfied in place of the above expression (1):

$$10 \leq M \leq 90 \qquad (1)\text{-}1$$

wherein M is the same as defined above.

26. The process of claim 24 or 25, wherein the following expression (2)-1 is satisfied in place of the above expression (2):

$$1 \leq P \leq 20 \qquad (2)\text{-}1$$

wherein P is the same as defined above.

27. A process for producing an aromatic polyester film comprising forming an aromatic polyester obtained by the process of claim 1 or 15 into a film in accordance with an electrostatic casting method.

28. The process of claim 27 for producing an aromatic polyester film having a thickness of 10 to 500 μm.

* * * * *